United States Patent [19]

Newman

[11] 4,217,777
[45] Aug. 19, 1980

[54] FLOW MEASURING SYSTEM

[75] Inventor: Raymond A. Newman, Cheektowaga, N.Y.

[73] Assignee: NP Industries, Inc., Tonawanda, N.Y.

[21] Appl. No.: 3,071

[22] Filed: Jan. 12, 1979

[51] Int. Cl.³ .............................................. G01F 1/66
[52] U.S. Cl. ....................................... 73/198; 73/227; 73/291
[58] Field of Search ...................... 73/198, 194 A, 215, 73/227, 290 V; 364/510

[56] References Cited

U.S. PATENT DOCUMENTS

| | | | |
|---|---|---|---|
| 3,910,116 | 10/1975 | Smith | 73/290 V |
| 3,996,798 | 12/1976 | Vander Heyden | 73/215 X |
| 4,024,766 | 5/1977 | Perry | 73/422 R |
| 4,083,246 | 4/1978 | Marsh | 73/227 |
| 4,145,914 | 3/1979 | Newman | 73/290 V |

*Primary Examiner*—Charles A. Ruehl
*Attorney, Agent, or Firm*—Joseph P. Gastel; Martin Lukacher

[57] ABSTRACT

To measure liquid flow through channels with various cross sections, detectors of liquid level and velocity are placed in proximity to the liquid to measure flow in terms of the product of the cross sectional area of the fluid and its velocity. Adjustable switches are employed to provide input signals to the computation circuitry which are constants while the detectors provide the data signals which result from the dynamic measurements.

6 Claims, 4 Drawing Figures

FLOW MEASURING SYSTEM

The present invention relates to flow measuring systems and particularly to a system which is useful for making flow measurements notwithstanding differences in the installation where the liquid is monitored for the purpose of making such flow measurements.

The invention is especially suitable for use in waste water monitoring systems where waste water such as sewer outflows must be monitored for pollution control purposes. Features of the invention are however generally applicable for use in other flow measuring systems.

Flow measurements must oftentimes be made in installations, the design of which is dictated by other considerations than the needs of the flow measurement system. For example in waste water monitoring systems, the channel through which the water flows, may be in place amd may consist of a pipe having various cross-sectional profiles. Some pipes may be circular in cross section whereas others may be elliptical or square. Moreover, access to the pipes will be dictated by the installation. There may be different amounts of space above the pipe for location of the head of a liquid level detector. It is desirable for reasons of economy of design and manufacture to provide a flow measuring system which is universally adaptable to measure flow in spite of differences in the installation where the flow is to be measured. The flow measuring system must however be readily capable of being adapted or set up for the installation where it is to be used. Preferably set-up should be accomplished at the site of the installation so as to avoid factory recalls. The accuracy of the measurement must also not be affected by virtue of the flexibility of the flow measuring system to meet the needs of different types of installations.

Accordingly, it is an object of the present invention to provide an improved liquid flow measuring system which obtains flow measurements based on the velocity of the liquid in a channel and the area of the channel occupied by the flowing liquid.

It is a further object of the present invention to provide improved instrumentation for the measurement of the volume of flow of a liquid which is flexible in application so as to obtain information respecting flow through various types of channels, such as pipes having various cross-sectional profiles, e.g., elliptical, square and circular.

It is a still further object of the present invention to provide an improved system for measuring flow, especially of waste liquids in sewer pipes of various shapes, which accommodate different installations which may have different types of pipe and different locations of detectors for liquid level measurement.

Briefly described, a system for measuring the flow of liquid through a channel which embodies the invention utilizes a sonic detector having a head which is positionable at different distances from the base of the channel and provides data signals corresponding to the transit time for sonic signals between the top of the liquid and the head, which signals are variable with the level of the liquid in the channel. The system also utilizes a liquid velocity detector which also provides data signals which vary with the velocity of the liquid flowing through an area in the channel.

In order to provide flexibility for use of the system in different installations, e.g., with pipes of different cross-sectional profile and with detector heads located at different distances from the base of the pipe, because of access considerations, an input unit is provided which generates a plurality of constant data signals representing the cross-sectional profile of the channel through which the liquid is flowing and the velocity of the liquid. A micro-processor based computing device may be used for this purpose.

The foregoing and other objects, features and advantages of the invention as well as a presently preferred embodiment thereof will become more apparent from a reading of the following description in connection with the accompanying drawings in which.

Figure 1:
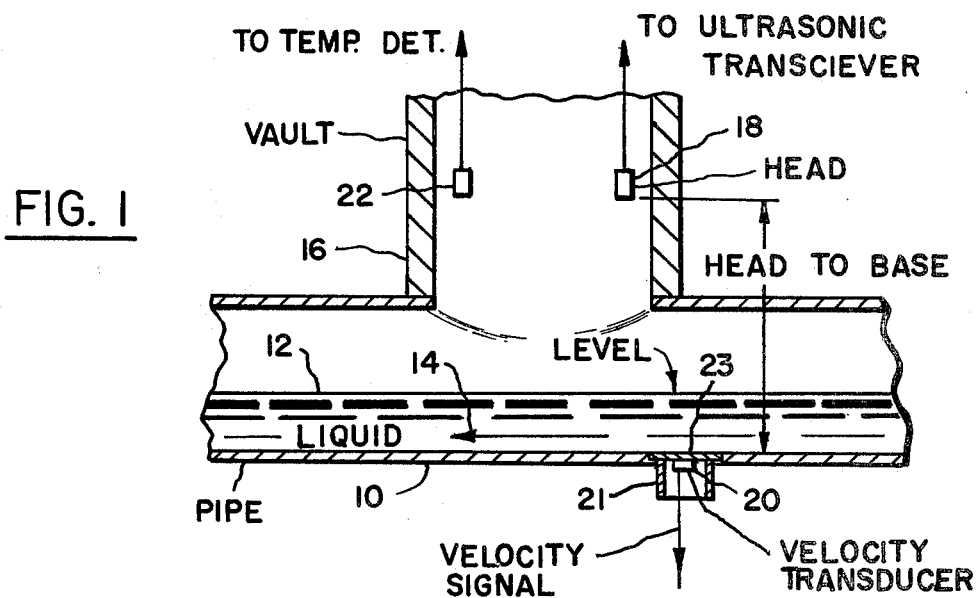
FIG. 1 is a schematic, cross-sectional view of an installation through which waste water flows where a flow measuring system embodying the invention is used.

Referring more particularly to FIG. 1 there is shown a pipe 10 through which liquid such as waste water flows in the direction shown by the arrow 14. The pipe may have various cross-sectional profiles, for example, circular, elliptical, or rectangular (including square). Access to the pipe 10 is through a vault 16, which may lead to the surface of the ground in which the pipe is located. To measure the level of the liquid above the base (the bottom) of the pipe 10 an ultrasonic distance measuring unit is used. This unit has a head 18 which transmits and receives return signals from the top or surface of the liquid 12 as it flows through an area of the cross-sectional profile of the pipe 10. This ultrasonic detection system may be of the type known in the art. Reference may be had to Jack A. Perry, U.S. Pat. No. 4,024,766 issued May 24, 1977, and patent application, Ser. No. 818,656, filed July 25, 1977, in the name of Raymond A. Newman, which is assigned to the same assignee as the present application (now U.S. Pat. No. 4,145,914). The Perry patent also illustrates the general type of waste water monitoring system in which the flow measuring system of the present invention is installed.

The space available for access to the pipe 10 and the frequency range of the ultrasonic signals governs the location of the head 18. The distance between the head 18 and the base of the pipe, thus may vary depending upon the installation. The head 18 is connected to an ultrasonic transceiver of the sonic distance measurement unit. This trans receiver may be of the type manufactured by NP Industries, Inc. of Niagara Falls, N.Y., their Model No. 135K or National Semi-conductor their Model No. LM1812N.

The velocity of the liquid flowing through the area of the liquid at the top of which the level is measured is detected by a velocity detector 20. This detector is installed on a box 21 under a cover plate 23. The cover plate is of nonconductive material, such as plastic. Preferably the plate 23 is substantially flush with the pipe interior surface. This detector 20 may be a doppler type velocity detection unit such as manufactured by NP Industries, Inc. their Model No. 5800. Other flow meters of the type mentioned in the Perry patent, referenced above, may also be used. The detector 20 provides an analog velocity signal which is used in the system.

Also contained in the vault is a temperature probe 22 which monitors the temperature in the vicinity where the head 18 is located. The use of a signal corresponding to temperature provides for greater accuracy of measurement of the liquid level since the velocity of sound varies with temperature and the measurement of liquid level depends upon the transit time of the transmitted and return ultrasonic signals between the head 18 and the surface of the liquid 12.

Figure 2:
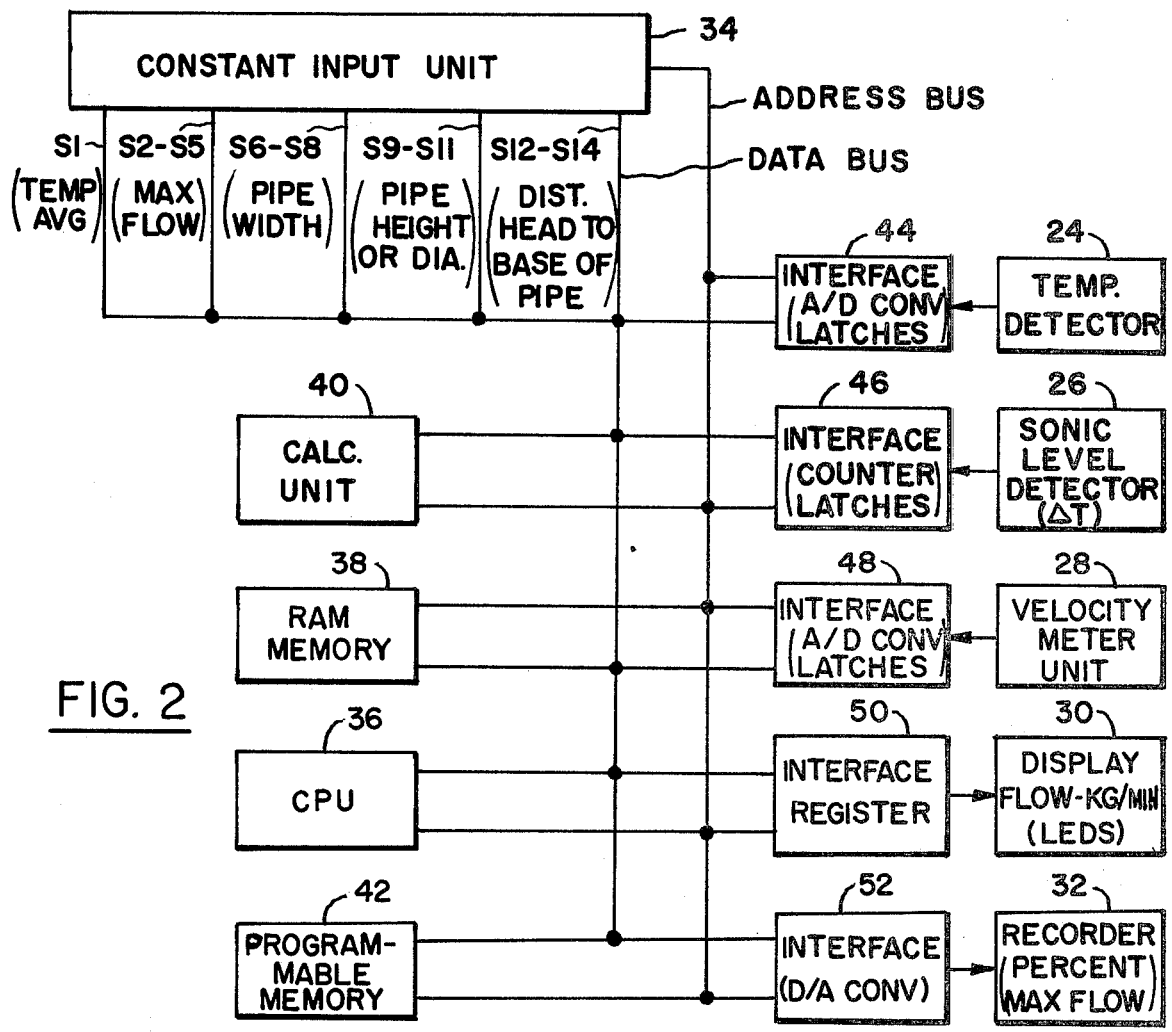
FIG. 2 is a block diagram of a flow measuring system embodying the invention.

Referring to FIG. 2, there is shown a temperature detector 24 which includes the temperature probe 22. This detector 24 outputs an analog signal which is used in the system. The head 18 is part of a sonic level detector 26 which measures the transit time ΔT between the head and the surface of the liquid 12. This transit time is measured in terms of the count stored in a counter between the transmission of the sonic signals and the reception of the return signals at the head 18, as is more fully discussed in the above referenced Newman patent application.

The velocity transducer 20 is part of a velocity meter unit 28 which outputs an analog signal corresponding to the velocity of the liquid flowing through the area where the level measurement is made, as explained above. The flow in terms of kilogallons per minute is displayed on a display unit 30 which may have light emitting diodes which form the digits of the number representing the kilogallons per minute flow of the liquid. It is oftentimes desirable to display or record the flow in terms of the percentage of the maximum flow through the pipe 10. A recorder such as a strip chart recorder 32 may be used for this purpose.

The system obtains flow measurements in terms of the area of the cross sectional profile through which the liquid flows and the velocity of the liquid, and particularly as the product of velocity and area. In order to determine the area, the height or level of the liquid above the base of the pipe 10 and the cross-sectional profile are obtained in the system by means of the sonic level detector 26 and a constant input unit 34. The constants which are used in the system for measuring the area are the pipe form factor, width, the pipe height or diameter, and the distance between the head and the base of the pipe. Other constants which are utilized are the average temperature and the maximum flow through the pipe, assuming the pipe was filled with the liquid. The average temperature input may be used as a backup in the event that the temperature input may be used as a backup in the event that the temperature detecting unit 24 is not utilized or is inoperative. The maximum flow, pipe width, pipe height or diameter, and the distance between the head and the base of the pipe, are all functions of the installation. It is a feature of this invention to be able to select these inputs thereby setting up this system to make measurements regardless of the cross-sectional profile of the pipe and the location of the head 18. In the event that the pipe is circular, the only input required is the pipe height which is the same as the diameter of the pipe. The pipe width need not be used. The distance from the head to the base of the pipe is of course used in every case.

Figure 4:
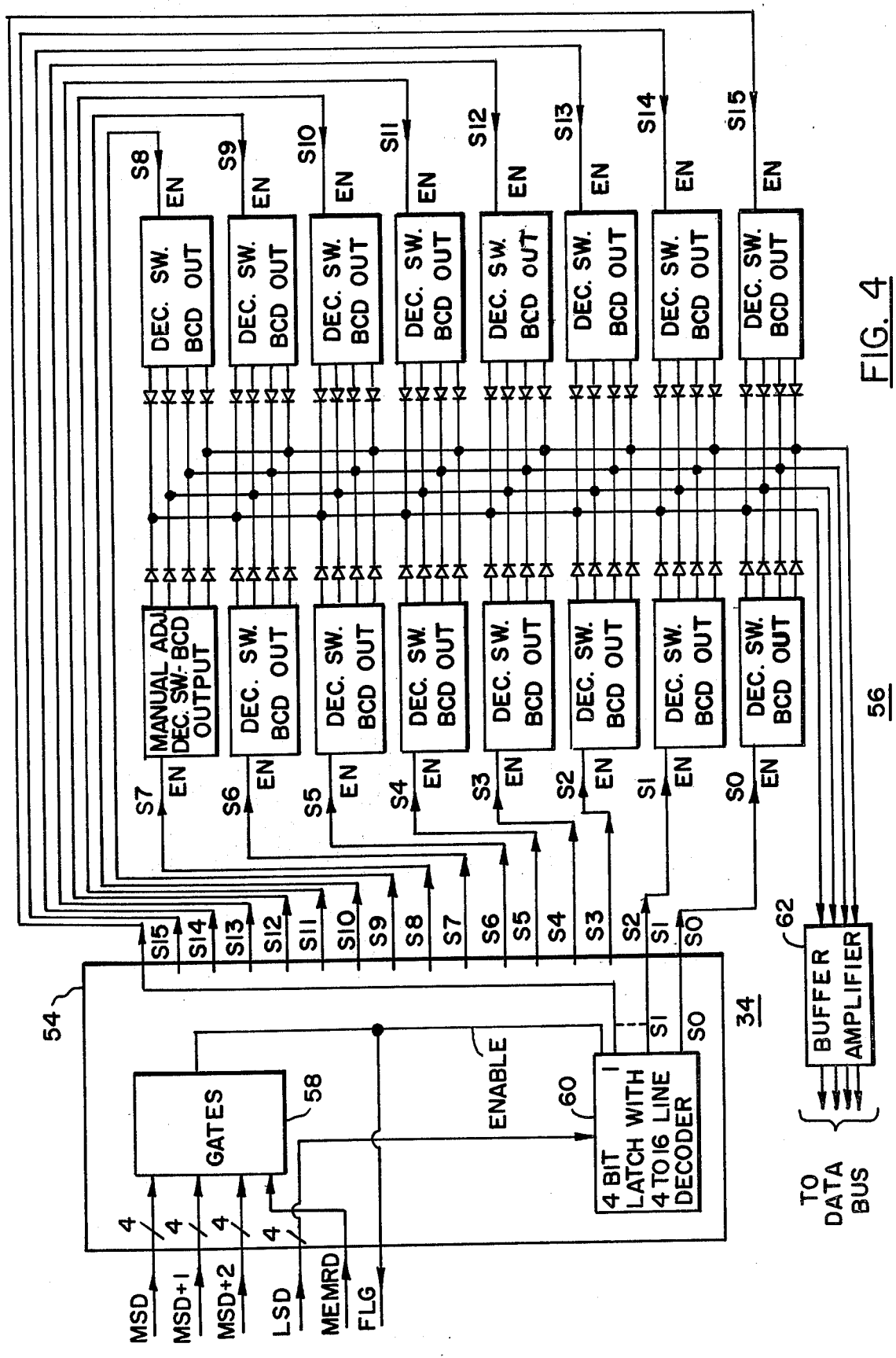
FIG. 4 is a block diagram showing in detail the constant input unit of the system shown in FIG. 2.

The constant input unit 34 is described in greater detail in connection with FIG. 4. Briefly it makes use of manually adjustable switches which provide digital signal outputs corresponding to the digits of the constant. For example, for average temperature only one digit is used. The second digit being understood to be zero. Accordingly, a single digit S1 may be set at 10°, 20°, 30° and so forth, depending upon the anticipated average temperature in the installation. The maximum flow is a 4 digit number to the base 10: the digits being S2, S3, S4, and S5. S2 and S3 may be the tens digit and the ones digit while S4 and S5 may be the tenths digit and the 100ths digit. Similarly a three-digit number S6, S7 and S8 represent the width of the pipe (say in feet) such as the major axis of an ellipse, if the cross sectional profile of the pipe is elliptical. The first two digits S6 and S7 are the tens, and ones digit respectively, while the S8 digit is the tenths digit. Three digit numbers S9 to S11 represent the height or circle diameter. Other three-digit numbers S12 to S14 represent the head to base of pipe distance. Each of these digits consist of a tens, ones, and tenths digit.

The constant input unit is connected to the address and data busses of a microprocessor. The microprocessor consists of a central processing unit (CPU) 36 such as an RCA large scale integrated circuit type 1802. This central processor or CPU 36 operates with a RAM or random access memory 38 which may be used to store the addresses used in carrying out the computations under the control of the CPU 36. The computations are performed in a calculating unit 40 which may be a calculator chip such as National Semiconductor MOS/-LSI number oriented microprocessor chip 57109. The program of operations of the microprocessor may be stored in a programmable memory such as an EPROM 42.

Interface units 44, 46, 48, 50 and 52 connect the temperature detector 24, sonic level detector 26, velocity meter unit 28, display 30 and recorder 32 to the address and data busses. The interface 44 includes an analog to digital converter and latches or registers which convert the analog temperature signal from the temperature probe 22 after conditioning in the detector 24 into a digital signal which is held in the latches until called for and fetched by the microprocessor. The interface unit 46 for the sonic level detector 26 includes the counter mentioned above as well as latches which store the digital signal representing the transit time ΔT until fetched by the microprocessor. An analog to digital converter and latches in the interface 48 convert and store the analog signal from the velocity transducer in the form of a digital signal. The interface 50 for the display 30 may be a register while the interface 52 for the recorder 32 may be a digital to analog converter since the recorder 32 operates on analog signals.

Figure 3:
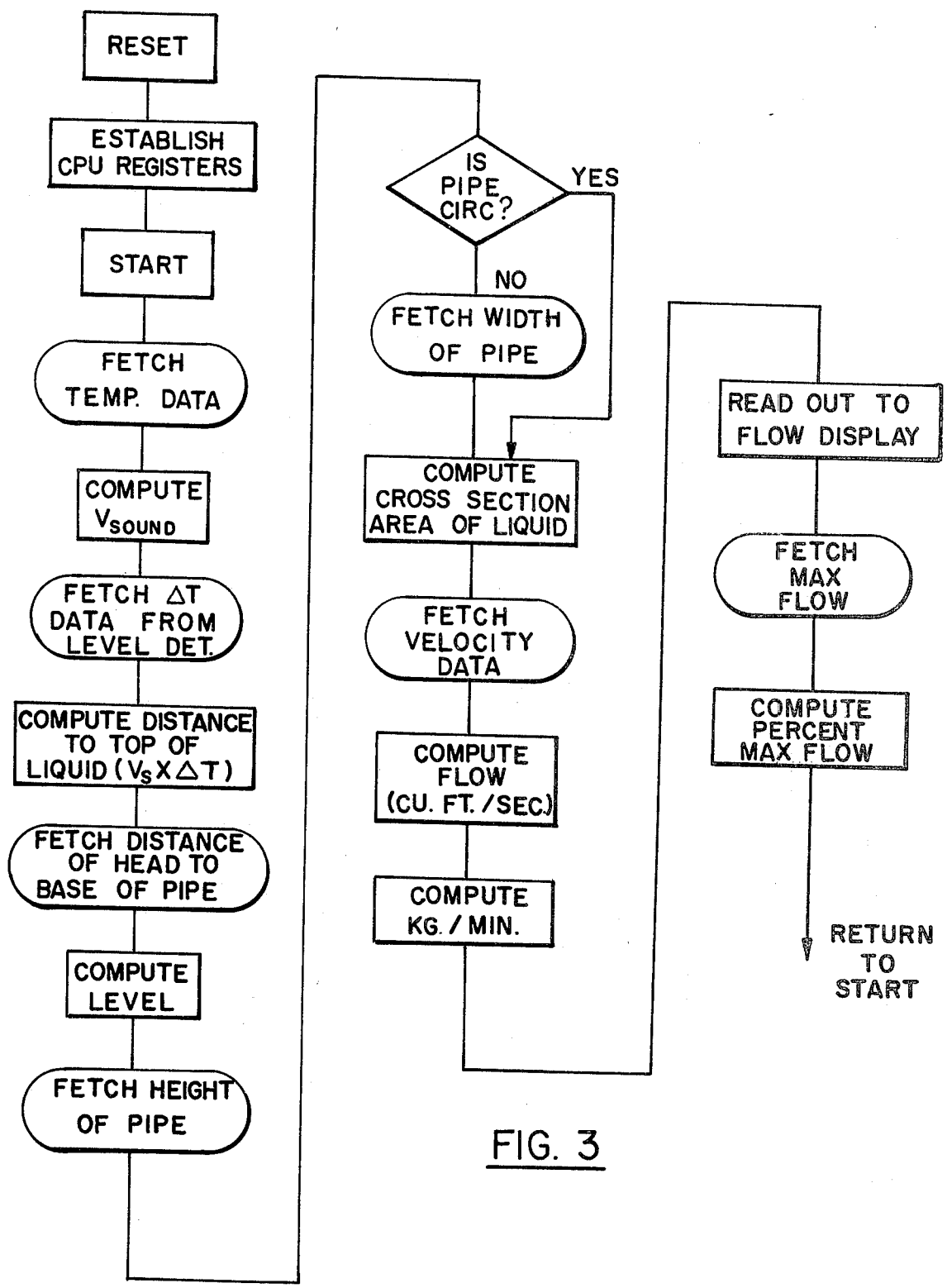
FIG. 3 is a flow diagram illustrating the operation of the system shown in FIG. 2.

The operation of the system may be better understood from the flow chart of FIG. 3. The microprocessor is reset at the beginning of operation which automatically establishes the registers in the CPU 36 to hold the address of memory locations in RAM 38 that are to be accessed for data. After start, the temperature data is fetched from the interface 44 and is transferred to the calculating unit 40 which computes the velocity of sound by multiplying 13044 by the square root of a fraction. the numerator of this fraction is 273 plus temperature in degrees centigrade as obtained from the temperature detector 24 and the denominator is 273.

Next, the transit time, ΔT, data is fetched from the level detector interface 46. The distance to the top of the liquid is then computed in the calculating unit in terms of the product of the velocities of sound and the transit time ΔT. The constant representing the head to base of pipe distance is then fetched from the constant input unit 34. The level of the liquid is then computed as the difference between the head to base distance and the distance to the top of the liquid.

The constant input unit also provides the height of the pipe 10 which is then fetched. If the pipe is circular, only the S9 to S11 digits are utilized. If the pipe is square or elliptical the width of the pipe is also fetched from the constant input unit 34. The calculating unit 40 then computes the cross-sectional area of the liquid at which the flow measurement is to be made. This cross-sectional area is the area of a segment of an ellipse, circle, or rectangle. For example, the area of the segment of an elliptical pipe is determined by using the pipe width, the height of the pipe, and the level in accordance with the following equation $$A = (\pi ab/2 + a/b \, (y\sqrt{b^2 - y^2} + b^2 \, Arc \sin y/b)$$

where a is one-half the width of the pipe, be is one-half the height of the pipe and y is the level of the liquid in the pipe. In the case of a square or circular pipe the calculation proceeds on the basis of the formula for the area of a segment of a rectangle or the segment of a circle.

Under program control, the velocity data signal is then fetched. The flow in terms of cubic feet per second is then computed as a product of the velocity and the cross-sectional area of the liquid. The calculating unit then converts and computes the flow in terms of kilogallons-per-minute. The kilogallons-per-minute output is read out to the display 30 via the interface 50. also the kilogallons-per-minute flow is utilized after the maximum flow constant is fetched from the constant input unit 34 to compute the percent maximum flow which is read out to the interface 52 for the recorder 32. the program then returns to start and repeats the flow measurement. The timing is preferably such that the flow measurement is completed every few minutes and the displays and recorder are updated accordingly.

The constant input unit 34 consists of a decoder 54 and a switching unit 56. The decoder consists of gates 58 which may be preset as by switches associated with the individual gate units such that a command to read the constants is obtained from the three most significant digits, MSD, MSD-1 and MSD-2 of the address signal on the address bus. The least significant digit LSD and the three most significant digits constitute the address in hexidecimal code. The gates are also enabled when the memory read MEMRD line goes high and enables the output from the gates. The LSD line is decoded into sixteen outputs S0 to S15 in an integrated circuit four-bit latch which includes a four to sixteen line decoder. This may be microprocessor integrated circuit chip type CD 4514B manufactured by RCA Corp. A flag (FLG) that the decoder 60 is enabled is also transmitted from the gates back to the CPU 36.

On each enable, one of sixteen manually adjusted decimal switches which produce binary coded decimal (BCD) outputs is enabled. These switches may be of the type sold by AMP of Harrisburg, Pennsylvania. Their type 53919. Each switch is manually adjustable to produce a BCD output corresponding to a decimal digit from zero to nine. Not all of the switches are utilized since only S1 to S14 digits are needed in the system. Accordingly, the digits for the S0 and S15 lines are set at zero and not utilized in the system. Each time the gates 58 of the decoder are enabled a different decimal switch is enabled and the decimal digit in BCD code from that switch is outputted through buffer amplifiers 62 to the data bus where it is used to provide the constant inputs from which the area of the pipe through which the liquid flows is obtained.

From the foregoing description it will be apparent that there has been provided an improved flow measuring system which is adapted to be used with various types of installations and can be set up on site to accommodate the cross sectional profile and the location of the liquid level transducer head at that installation site. Variations and modifications in the hereindescribed system will undoubtedly suggest themselves to those skilled in the art. Accordingly, the foregoing description should be taken as illustrative and not in a limiting sense.

What is claimed is:

1. A system for measuring the flow of liquid through a channel which comprises
   (a) sonic detector means having a head which is positionable at different distances from the base of the channel and provides data signals corresponding to the transit time for sonic signals between the top of the liquid and said head which are variable with the level of said liquid in said channel,
   (b) means for providing data signals which vary with the velocity of said liquid flowing along said channel,
   (c) means for generating constant data signals representing the cross sectional profile of said channel and the distance between said head and the base of said channel, and
   (d) means responsive to said variable data signals representing distance to the top of said liquid and velocity of said liquid and said constant data signals for obtaining an output corresponding to the flow of said liquid through said channel, in terms of the product of the area of said cross sectional profile of said channel through which said liquid is flowing and the velocity of said liquid.

2. The invention as set forth in claim 1 wherein said generating means comprises a plurality of switches for outputting data signals representing different digits when enabled, and means for enabling said switches to read a plurality of data signals corresponding to the digits of said constants.

3. The invention as set forth in claim 2 wherein said generating means further comprises decoder means operated by said flow output obtaining means for enabling said switches in timed sequence.

4. The invention as set forth in claim 3 wherein said flow output obtaining means comprises a programmed microprocessor having a central processing unit, memory means, and means for calculating said flow output from said constant and variable data signals.

5. The invention as set forth in claim 4 wherein said generating means also includes a plurality of said switches for providing digital signals representing the digits of a number corresponding to the maximum flow through said channel, and wherein said flow output obtaining means includes means responsive to said maximum flow digital signals and said flow output for providing an output representing the percent of said maximum flow.

6. The invention as set forth in claim 5 further comprising means responsive to said flow output for displaying a plurality of digits representing said flow output.

* * * * *